(12) United States Patent
Lin et al.

(10) Patent No.: US 12,238,830 B2
(45) Date of Patent: Feb. 25, 2025

(54) LIGHTING APPARATUS

(71) Applicant: LEEDARSON LIGHTING CO., LTD., Fujian (CN)

(72) Inventors: Qiqiang Lin, Fujian (CN); Yongqiang Wu, Fujian (CN); Hemu Ye, Fujian (CN); Zongyuan Liu, Fujian (CN); Yankun Li, Fujian (CN); Yibin Chen, Fujian (CN)

(73) Assignee: LEEDARSON LIGHTING CO., LTD., Fujian (CN)

( * ) Notice: Subject to any disclaimer, the term of this patent is extended or adjusted under 35 U.S.C. 154(b) by 228 days.

(21) Appl. No.: 17/848,227

(22) Filed: Jun. 23, 2022

(65) Prior Publication Data

US 2022/0418066 A1 Dec. 29, 2022

(30) Foreign Application Priority Data

Jun. 23, 2021 (CN) .......................... 202121406933.2

(51) Int. Cl.
*H05B 45/20* (2020.01)
*H05B 45/46* (2020.01)

(52) U.S. Cl.
CPC ............. *H05B 45/20* (2020.01); *H05B 45/46* (2020.01)

(58) Field of Classification Search
CPC .... H05B 45/3725; H05B 45/10; H05B 45/14; H05B 45/20; H05B 45/31; Y10S 323/905; Y10S 315/04; Y02B 20/30
See application file for complete search history.

(56) References Cited

U.S. PATENT DOCUMENTS

| | | | | |
|---|---|---|---|---|
| 7,288,902 B1* | 10/2007 | Melanson | .......... | H05B 45/3725 315/DIG. 4 |
| 2014/0239844 A1* | 8/2014 | Bruwer | ................... | H05B 45/20 315/292 |
| 2015/0061497 A1* | 3/2015 | Martins | ................... | H05B 45/10 315/291 |
| 2015/0176789 A1* | 6/2015 | Garcia | ..................... | F21S 10/04 362/157 |

FOREIGN PATENT DOCUMENTS

| EP | 3312497 A1 * | 4/2018 |
|---|---|---|
| GB | 2519794 A * | 5/2015 |

* cited by examiner

*Primary Examiner* — Anh Q Tran
(74) *Attorney, Agent, or Firm* — Chun-Ming Shih; LANWAY IPR SERVICES

(57) ABSTRACT

A lighting apparatus includes a filter tuner, a bridge rectifier, multiple types of LED modules, a monitor circuit, and a current source. The filter tuner is connected to a manual switch and an external AC power. The filter tuner changes a conductive angle of the external AC power to an adjusted AC input. The bridge rectifier receives the adjusted AC input to generate a DC output. Multiple types of LED modules are disposed for emitting lights of multiple color temperatures. The monitor circuit monitors the conductive angle to generate a control signal. The current source, according to the control signal, generates multiple corresponding driving currents respectively supplied to the multiple types of LED modules to mix a desired color temperature. The desired color temperature is associated with the conductive angle according to a predetermined relation.

19 Claims, 9 Drawing Sheets

LIGHTING APPARATUS

FIELD

The present invention is related to a lighting apparatus, and more particularly related to a lighting apparatus with a cost effective control function.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

Currently, more and more light devices use advanced technologies. However, there are still lots of houses deploying traditional switches and wiring.

For example, many people install wall switches connecting to a light device platform where a light device is installed.

It is usually not easy or may cause an additional cost if additional control function is introduced.

For example, a traditional wall switch may be used for increasing or decreasing a light intensity of a light device. It may be difficult to change such design unless another new switch is bought and disposed on the wall.

Therefore, it is beneficial to find a new design to meet the balance of cost and new functions. Currently, more and more light devices use advanced technologies. However, there are still lots of houses deploying traditional switches and wiring.

For example, many people install wall switches connecting to a light device platform where a light device is installed.

It is usually not easy or may cause an additional cost if additional control function is introduced.

For example, a traditional wall switch may be used for increasing or decreasing a light intensity of a light device. It may be difficult to change such design unless another new switch is bought and disposed on the wall.

Therefore, it is beneficial to find a new design to meet the balance of cost and new functions. Currently, more and more light devices use advanced technologies. However, there are still lots of houses deploying traditional switches and wiring.

For example, many people install wall switches connecting to a light device platform where a light device is installed.

It is usually not easy or may cause an additional cost if additional control function is introduced.

For example, a traditional wall switch may be used for increasing or decreasing a light intensity of a light device. It may be difficult to change such design unless another new switch is bought and disposed on the wall.

Therefore, it is beneficial to find a new design to meet the balance of cost and new functions. Currently, more and more light devices use advanced technologies. However, there are still lots of houses deploying traditional switches and wiring.

For example, many people install wall switches connecting to a light device platform where a light device is installed.

It is usually not easy or may cause an additional cost if additional control function is introduced.

For example, a traditional wall switch may be used for increasing or decreasing a light intensity of a light device. It may be difficult to change such design unless another new switch is bought and disposed on the wall.

Therefore, it is beneficial to find a new design to meet the balance of cost and new functions.

SUMMARY

In some embodiments, a lighting apparatus includes a filter tuner, a bridge rectifier, multiple types of LED modules, a monitor circuit, and a current source.

The filter tuner is connected to a manual switch and an external AC power.

The filter tuner changes a conductive angle of the external AC power to an adjusted AC input.

The bridge rectifier receives the adjusted AC input to generate a DC output.

Multiple types of LED modules are disposed for emitting lights of multiple color temperatures.

The monitor circuit monitors the conductive angle to generate a control signal.

The current source, according to the control signal, generates multiple corresponding driving currents respectively supplied to the multiple types of LED modules to mix a desired color temperature.

The desired color temperature is associated with the conductive angle according to a predetermined relation.

In some embodiments, a total light intensity of the multiple types of LED modules is increased when the conducting angle is increasing and is below a first threshold.

In some embodiments, the desired color temperature is changed when the conductive angle is changed under the first threshold.

In some embodiments, the desired color temperature is increased when the total light intensity is increased.

In some embodiments, after the conductive angle is larger than the first threshold, the total light intensity of the multiple types of LED modules is kept constant and the desired color temperature keeps changing when the conductive angle is increasing.

In some embodiments, the predetermined threshold is set when the conductive angle is between 30% to 70%.

In some embodiments, the predetermined threshold is set when the conductive angle is between 45% to 55%.

In some embodiments, the filter tuner is a TRIAC device.

In some embodiments, the filter tuner is a thyristor.

In some embodiments, the filter tuner is a bistable switch conducting when the bistable switch receives a current trigger and continuing to conduct until a voltage across the device is reversed biased.

In some embodiments, the filter tuner is a bistable switch conducting when the bistable switch receives a current trigger and continuing to conduct until a voltage across the device is removed.

In some embodiments, a first LED module of the multiple types of LED modules receives a constant driving current even when the conductive angle is changed. A second LED module of the multiple types of LED modules receives a variant driving current when the conductive angle is changed.

In some embodiments, the lighting apparatus may also include a bracket for changing a light output angle of the multiple types of LED modules.

When the light output angle is changed, the color temperature is changed.

In some embodiments, the lighting apparatus may also include a threshold switch and a light housing.

The multiple types of LED modules are disposed in the housing.

The threshold switch is disposed on an external surface of the light housing for a user to operate.

The threshold switch changes the first threshold.

In some embodiments, the lighting apparatus may also include a range switch and a light housing.

The multiple types of LED modules are disposed in the housing.

The range switch is disposed on an external surface of the light housing for a user to operate.

The range switch changes a variation range of the desired color temperature.

In some embodiments, the lighting apparatus may also include a mode switch and a light housing.

The multiple types of LED modules are disposed in the housing.

The mode switch is disposed on an external surface of the light housing for a user to operate.

The mode switch is operated to enable or disable the function tuner.

In some embodiments, after the filter tuner is changed, the total light intensity is changed immediately but the desired color temperature is changed gradually in a predetermined time period.

In some embodiments, the multiple types of LED modules comprise multiple elongated light strips.

In some embodiments, the multiple elongated light strips are twisted.

In some embodiments, the multiple elongated light strips of different color temperatures are integrated as a bent light bar.

DETAILED DESCRIPTION

Figure 6:
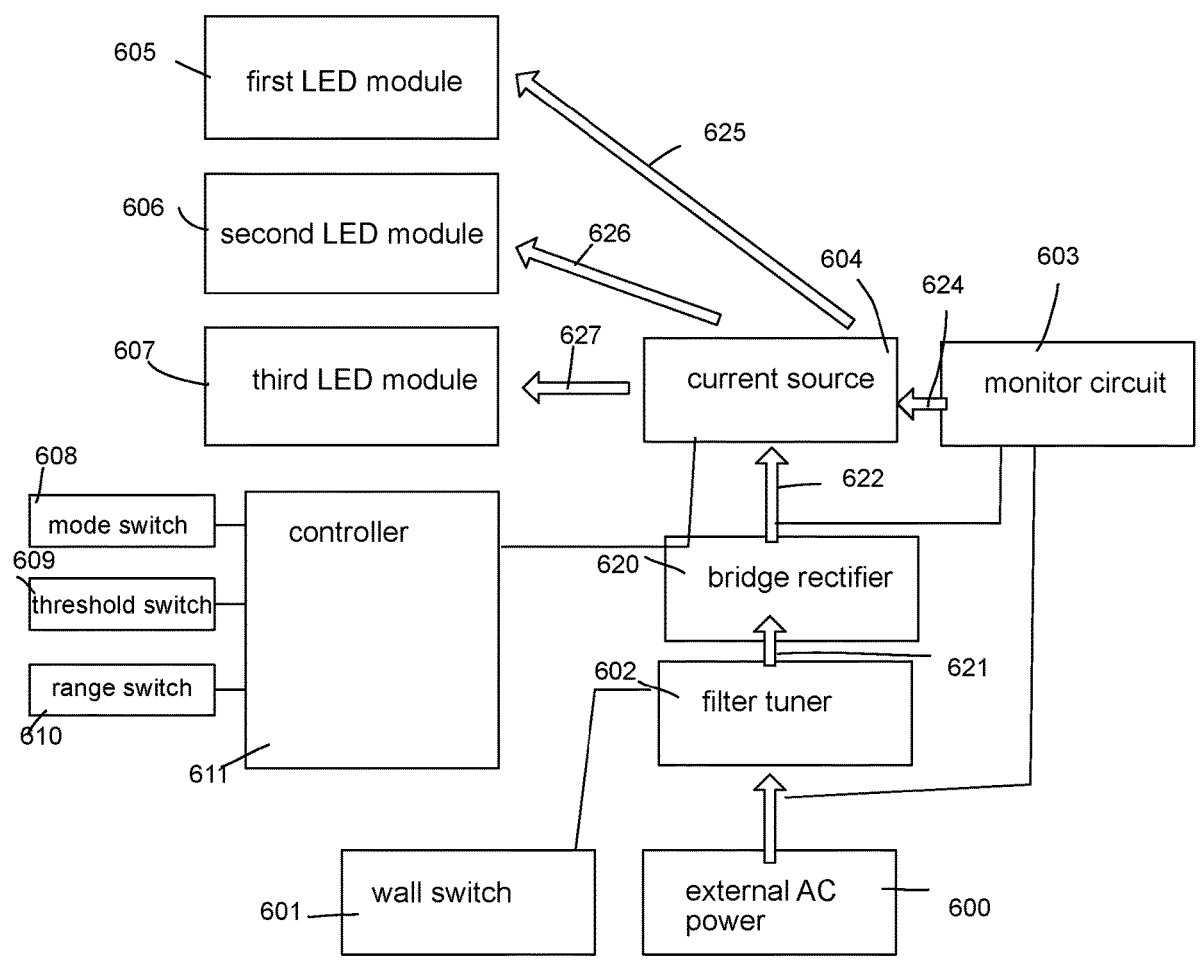
FIG. 6 illustrates another embodiment of a lighting apparatus.

In FIG. 6, a lighting apparatus includes a filter tuner 602, a bridge rectifier 620, multiple types of LED modules 605, 606, 607, a monitor circuit 603, and a current source 604.

The filter tuner 602 is connected to a manual switch like a wall switch 601 and an external AC power 600.

The wall switch 601 may be fixed on a wall with a wire connected to an installation platform for installing the lighting apparatus.

The filter tuner 602 changes a conductive angle of the external AC power to an adjusted AC input 621.

The bridge rectifier 620 receives the adjusted AC 621 to generate a DC output 622.

Multiple types of LED modules 605, 606, 607 are disposed for emitting lights of multiple color temperatures.

The monitor circuit 603 monitors the conductive angle to generate a control signal 624.

The current source 604, according to the control signal 624, generates multiple corresponding driving currents 625, 626, 627 respectively supplied to the multiple types of LED modules 605, 606, 607 to mix a desired color temperature.

The desired color temperature is associated with the conductive angle according to a predetermined relation.

In some embodiments, a total light intensity of the multiple types of LED modules is increased when the conducting angle is increasing and is below a first threshold.

Figure 5:
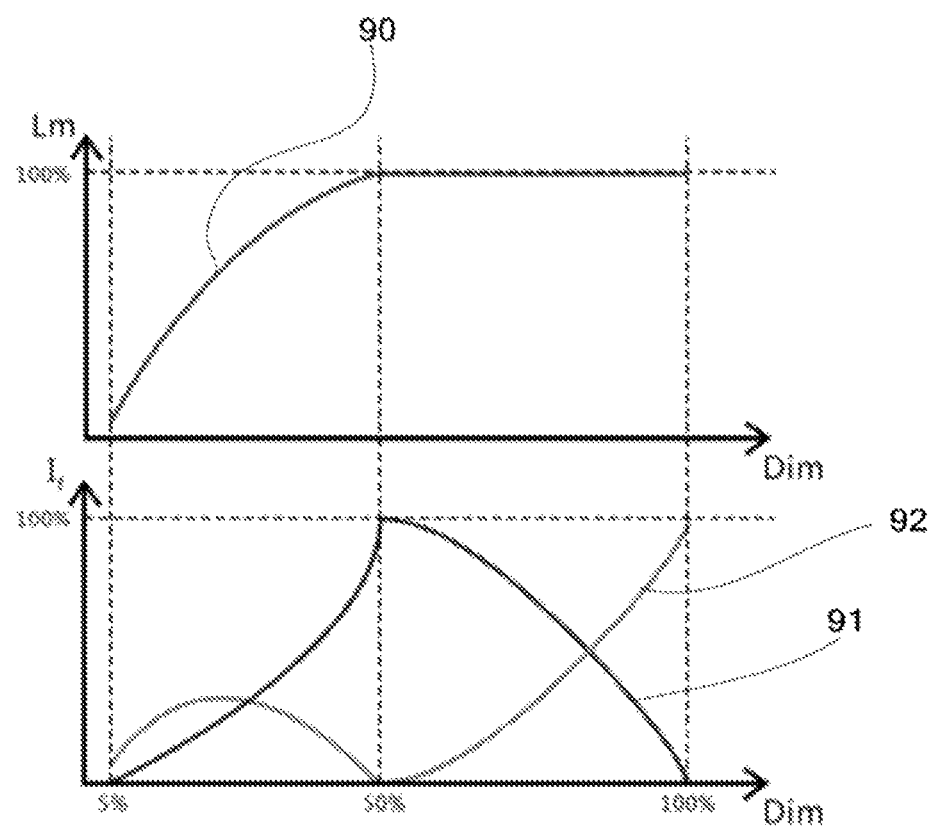
FIG. 5 illustrates an example showing a relation between a conductive angle and a color temperature and a light intensity.

FIG. 5 shows an example of such predetermined relation.

In FIG. 5, there are two diagrams. In the above diagram, the X-axis refers to a dimmer to turn on with a range from 0% to 100%. Such dimmer may be a rotation device with a TRIAC unit integrated therein. Users may operate the dimmer to choose a turn-on level, e.g. 0% to 100%. When the dimmer is operated, a conductive angle is selected which further limits a corresponding amount of AC current to pass, thus to adjust an input current amount.

The Y-axis of the top diagram in FIG. 5 refers to a total light intensity. In the top diagram of FIG. 5, the curve line 90 is increased when the dimmer is operated to change from 0% to 50%. In this example, 50% is the first threshold. After 50%, the total light intensity is kept constant.

The X-axis of the bottom diagram of FIG. 5 refers to the dimmer. The Y-axis refers to different light intensity of two types of LED modules. Two curve lines 91, 92 refer to the two types of LED modules. The curve lines 91, 92 of two LED modules with different color temperatures are varied to generate different color temperatures.

In some embodiments, the desired color temperature is changed when the conductive angle is changed under the first threshold.

In some embodiments, the desired color temperature is increased when the total light intensity is increased.

In some embodiments, after the conductive angle is larger than the first threshold, the total light intensity of the multiple types of LED modules is kept constant and the desired color temperature keeps changing when the conductive angle is increasing.

In some embodiments, the predetermined threshold is set when the conductive angle is between 30% to 70%.

In some embodiments, the predetermined threshold is set when the conductive angle is between 45% to 55%.

In some embodiments, the filter tuner is a TRIAC device.

In some embodiments, the filter tuner is a thyristor.

In some embodiments, the filter tuner is a bistable switch conducting when the bistable switch receives a current trigger and continuing to conduct until a voltage across the device is reversed biased.

In some embodiments, the filter tuner is a bistable switch conducting when the bistable switch receives a current trigger and continuing to conduct until a voltage across the device is removed.

In some embodiments, a first LED module of the multiple types of LED modules receives a constant driving current even when the conductive angle is changed. A second LED module of the multiple types of LED modules receives a variant driving current when the conductive angle is changed.

Figure 7:
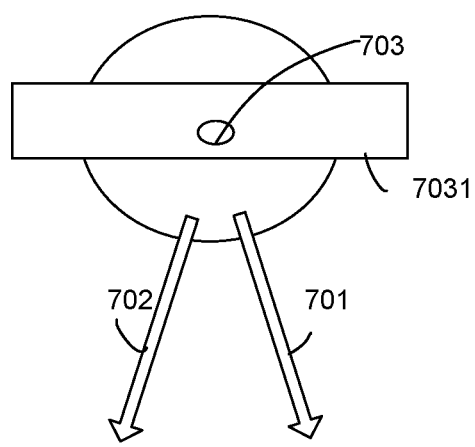
FIG. 7 illustrates a lighting apparatus with variable light output angle.

In FIG. 7, the lighting apparatus may also include a bracket 703 for changing a light output angle 701 to 702 of the multiple types of LED modules.

For example, the bracket 703 may be disposed in a downlight device. In a downlight device, a rotation unit is disposed so that a light module disposed with the LED modules is rotated to change a light output angle.

When the light output angle is changed, the light output angle is detected, e.g. using a mechanic trigger unit to change a resistor value so that the driver circuit changes predetermined parameter, like the first threshold or color temperature mentioned above.

In some embodiments, when the light output angle is changed, the color temperature is changed.

In FIG. 6, the lighting apparatus may also include a threshold switch 609 and a light housing. FIG. 7 shows an example of a downlight device that has a housing 7031 for disposing and fixing components of the downlight device.

The multiple types of LED modules are disposed in the housing.

The threshold switch 609 in FIG. 6 is disposed on an external surface of the light housing for a user to operate.

The threshold switch 609 changes the first threshold.

In some embodiments, the lighting apparatus may also include a range switch 610 and a light housing.

The multiple types of LED modules are disposed in the housing.

The range switch 610 is disposed on an external surface of the light housing for a user to operate.

The range switch 610 changes a variation range of the desired color temperature.

In some embodiments, the lighting apparatus may also include a mode switch 608 and a light housing.

The multiple types of LED modules are disposed in the housing.

The mode switch 608 is disposed on an external surface of the light housing for a user to operate.

The mode switch 608 is operated to enable or disable the function tuner. For example, the AC power may be directed from a second path, bypassing the filter tuner mentioned above when the mode switch 610 is operated.

In some embodiments, after the filter tuner is changed, the total light intensity is changed immediately but the desired color temperature is changed gradually in a predetermined time period.

Such function provides a smooth transition when users operate the wall switch that triggers changes of the filter tuner. For example, the total light intensity may be changed immediately when users rotates the wall switch. But, the driving currents for different LED modules are controlled to changed more slowly than the changes of the total light intensity.

Such function makes the lighting apparatus to provide a nice setting experience.

Figure 8:
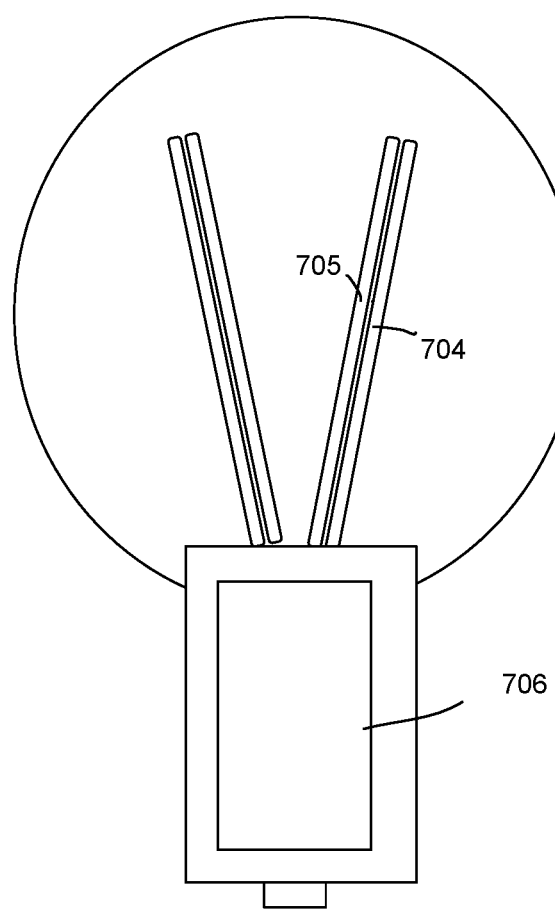
FIG. 8 illustrates a light bulb device that implements the inventive function.

In FIG. 8, the multiple types of LED modules comprise multiple elongated light strips 704, 705.

In some embodiments, the multiple elongated light strips 704, 705 are twisted.

Figure 9:
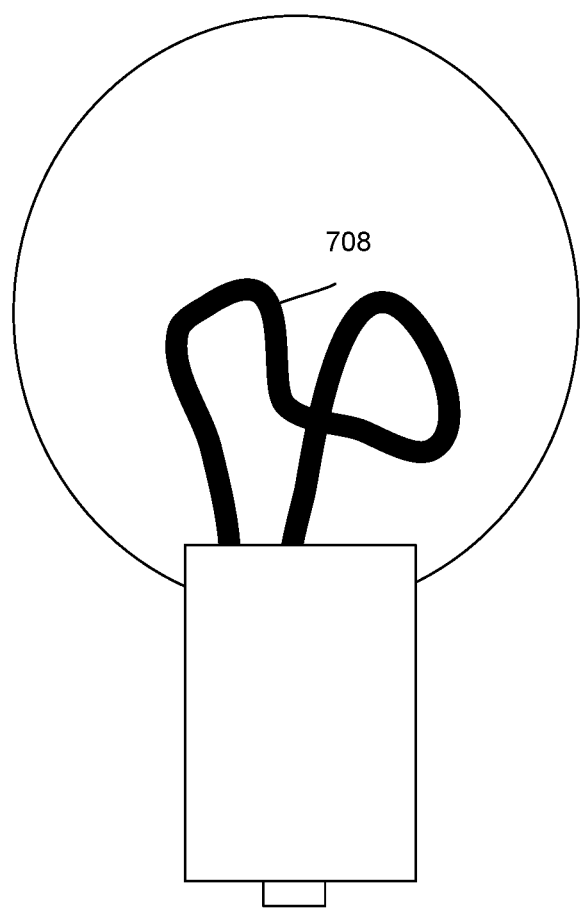
FIG. 9 illustrates another light bulb device that has bent light strips.

In FIG. 9, the multiple elongated light strips of different color temperatures are integrated as a bent light bar 708.

Figure 1:
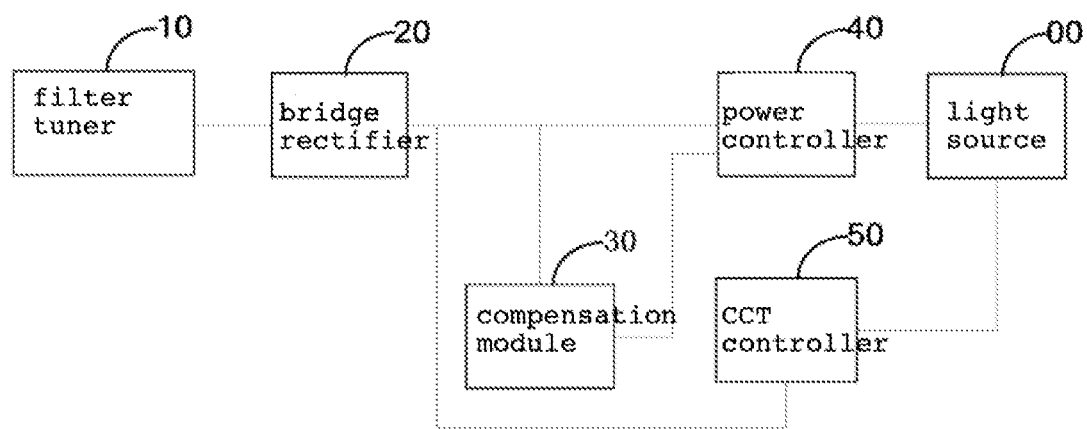
FIG. 1 illustrates a first embodiment of a lighting apparatus.

Please refer to FIG. 1. FIG. 1 illustrates a lighting apparatus embodiment.

In FIG. 1, the lighting apparatus includes a filter tuner 10, a bridge rectifier 20, a compensation module 30, a CCT (color temperature) controller 50, a power controller 40, and a light source 00.

The filter tuner 10 may be operated to change a conductive angle, e.g. 0-90 degrees in a sine wave, which corresponds to 0% to 50% of AC power to pass through.

The bridge rectifier 20 is used for converting an AC power to a DC power. The compensation module 30 detects the conductive angle and generates a control signal accordingly. The CCT controller 50 converts the control signal to parameters to control the power controller 40 to generate corresponding driving currents to the light source 00 that contains multiple types of LED modules with different color temperatures to emit lights of varying color temperatures.

Figure 2:
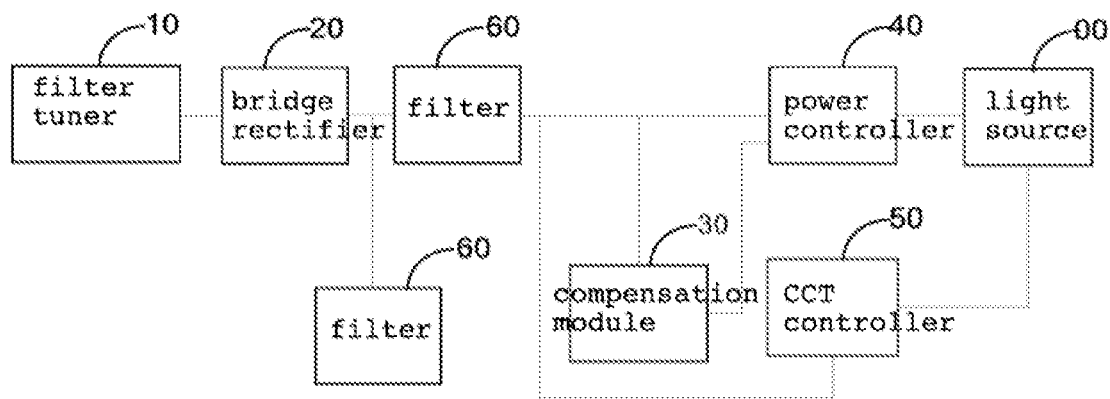
FIG. 2 illustrates a second embodiment of a lighting apparatus.

FIG. 2 shows another embodiment. In FIG. 2, in addition to the components mentioned in FIG. 1, two filters 60 are disposed to improve the DC output, which helps increase the life span and light output stability.

Figure 3:
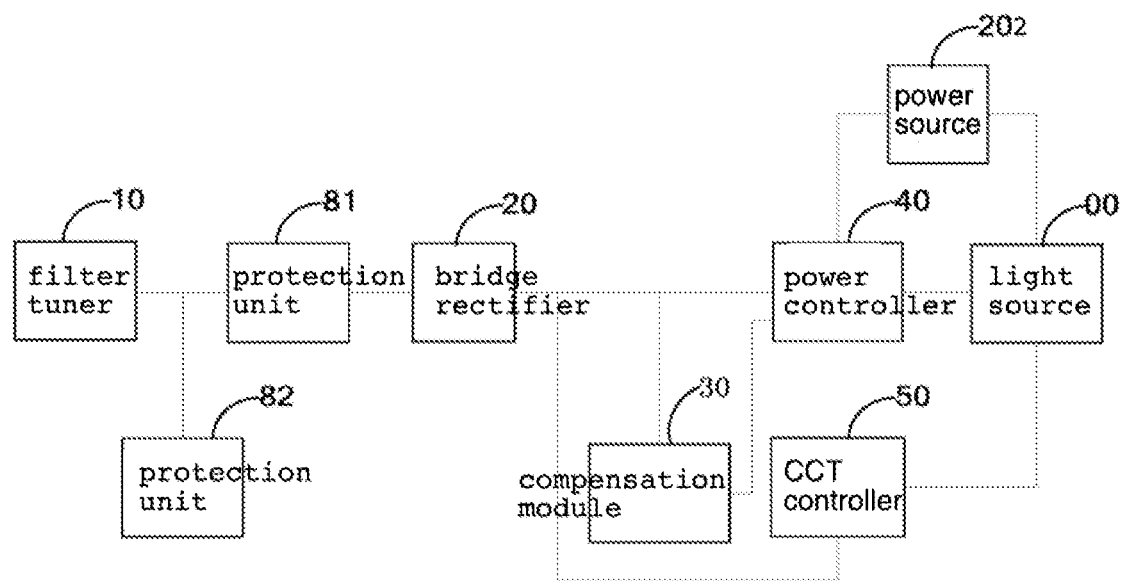
FIG. 3 illustrates a third embodiment of a lighting apparatus.

FIG. 3 shows another embodiment. In FIG. 3, in addition to the components mentioned in FIG. 1, a protection unit 81 is disposed to prevent damage of the components in the lighting apparatus.

The monitor circuit mentioned above may be disposed in the compensation module 30.

Figure 4:
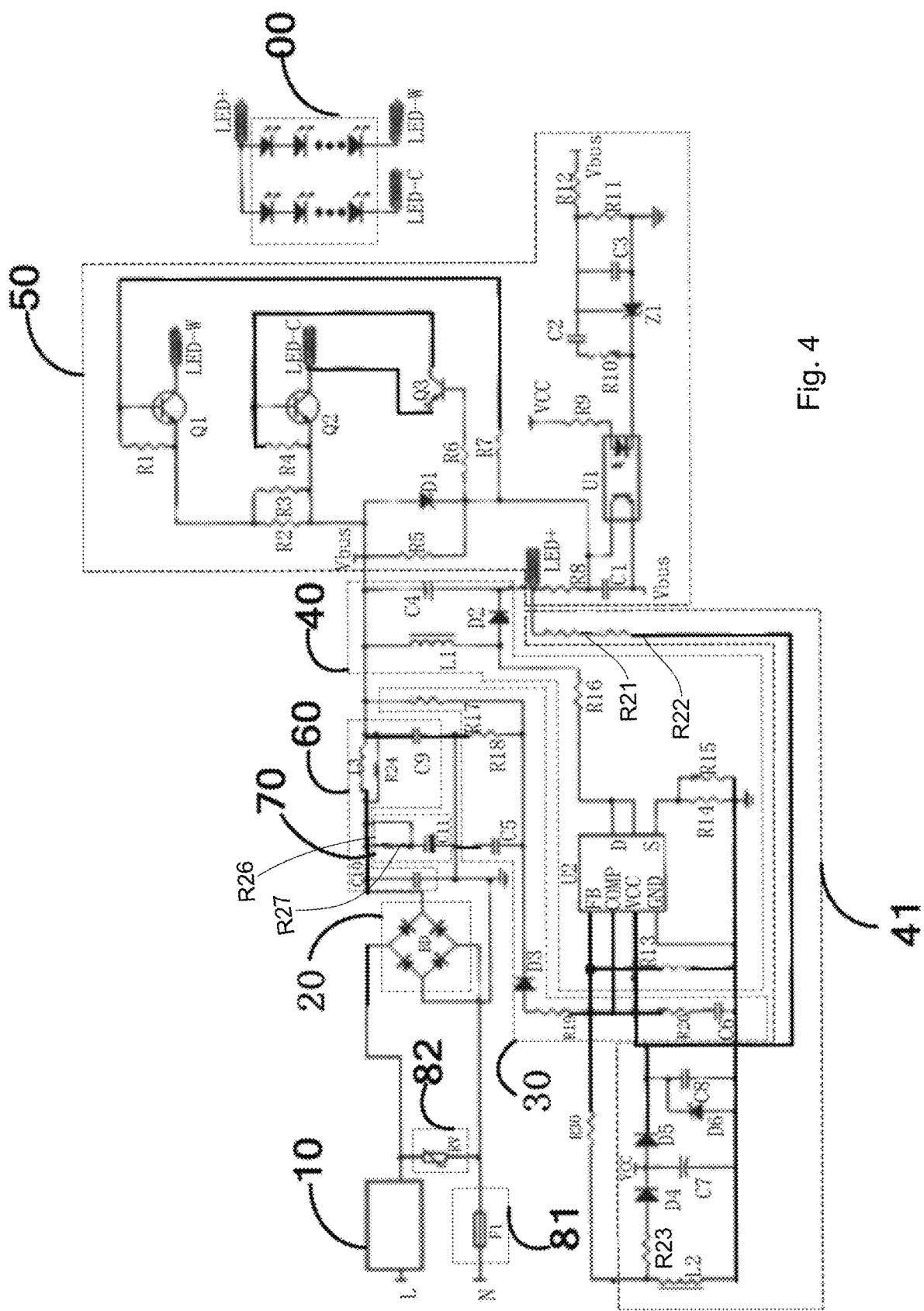
FIG. 4 illustrates a detailed circuit diagram as an example for implementing a lighting apparatus.

FIG. 4 illustrates a detailed circuit diagram as an example to implement the lighting apparatus.

In FIG. 4, the light source 00 has two series of LED modules, LED-C and LED-W. The LED-C emits a different color temperature as the LED-W.

In FIG. 4, the CCT controller 50 includes resistors R1, R2, R3, R4, R5, R6, R7, R8, R9, R10, R11, R12, transistors Q1, Q2, Q3, capacitors C1, C2, C3, chip U1, diodes D1 to generate control signals for generating a mixed color temperature.

The power controller includes capacitors, chips U2, and diodes to generate power.

The bridge rectifier 20 converts an AC power to a DC output. There is also a buffer module 70, a filter module 60, a voltage protection module 82, a current protection module 81 and a tuner filter module 30. The power module 40 includes a power supply circuit 41.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:
   a filter tuner connected to a manual switch and an external AC power, wherein the filter tuner changes a conductive angle of the external AC power to an adjusted AC input;
   a bridge rectifier receiving the adjusted AC input to generate a DC output;
   multiple types of LED modules for emitting lights of multiple color temperatures;
   a monitor circuit for monitoring the conductive angle to generate a control signal; and
   a current source, according to the control signal, for generating multiple corresponding driving currents respectively supplied to the multiple types of LED modules to mix a desired color temperature, wherein the desired color temperature is associated with the conductive angle according to a predetermined relation, wherein a total light intensity of the multiple types of LED modules is increased when the conducting angle is increasing and is below a first threshold.

2. The lighting apparatus of claim 1, wherein the desired color temperature is changed when the conductive angle is changed under the first threshold.

3. The lighting apparatus of claim 2, wherein the desired color temperature is increased when the total light intensity is increased.

4. The lighting apparatus of claim 2, wherein, after the conductive angle is larger than the first threshold, the total light intensity of the multiple types of LED modules is kept constant and the desired color temperature keeps changing when the conductive angle is increasing.

5. The lighting apparatus of claim 4, wherein the predetermined threshold is set when the conductive angle is between 30% to 70%.

6. The lighting apparatus of claim 5, wherein the predetermined threshold is set when the conductive angle is between 45% to 55%.

7. The lighting apparatus of claim 1, wherein the filter tuner is a TRIAC device.

8. The lighting apparatus of claim 1, wherein the filter tuner is a thyristor.

9. The lighting apparatus of claim 1, wherein the filter tuner is a bistable switch conducting when the bistable switch receives a current trigger and continuing to conduct until a voltage across the device is reversed biased.

10. The lighting apparatus of claim 1, wherein the filter tuner is a bistable switch conducting when the bistable switch receives a current trigger and continuing to conduct until a voltage across the device is removed.

11. The lighting apparatus of claim 1, wherein a first LED module of the multiple types of LED modules receives a constant driving current even when the conductive angle is changed, and a second LED module of the multiple types of LED modules receives a variant driving current wherein the conductive angle is changed.

12. The lighting apparatus of claim 1, further comprising a bracket for changing a light output angle of the multiple types of LED modules, wherein when the light output angle is changed, the color temperature is changed.

13. The lighting apparatus of claim 1, further comprising a threshold switch and a light housing, wherein the multiple types of LED modules are disposed in the housing, wherein the threshold switch is disposed on an external surface of the light housing for a user to operate, wherein the threshold switch changes the first threshold.

14. The lighting apparatus of claim 1, further comprising a range switch and a light housing, wherein the multiple types of LED modules are disposed in the housing, wherein the range switch is disposed on an external surface of the light housing for a user to operate, wherein the range switch changes a variation range of the desired color temperature.

15. The lighting apparatus of claim 1, further comprising a mode switch and a light housing, wherein the multiple types of LED modules are disposed in the housing, wherein the mode switch is disposed on an external surface of the light housing for a user to operate, wherein the mode switch is operated to enable or disable the function tuner.

16. The lighting apparatus of claim 1, wherein after the filter tuner is changed, the total light intensity is changed immediately but the desired color temperature is changed gradually in a predetermined time period.

17. The lighting apparatus of claim 1, wherein the multiple types of LED modules comprise multiple elongated light strips.

18. The lighting apparatus of claim 17, wherein the multiple elongated light strips are twisted.

19. The lighting apparatus of claim 17, wherein the multiple elongated light strips of different color temperatures are integrated as a bent light bar.

* * * * *